(12) United States Patent
Han

(10) Patent No.: US 7,468,740 B2
(45) Date of Patent: Dec. 23, 2008

(54) METHOD AND APPARATUS FOR SCANNING THE CAMERA LOS IN A CONTINUOUS ZOOM CAMERA SYSTEM

(75) Inventor: Kee-Tae Han, Daejeon (KR)

(73) Assignee: Agency for Defense Development (KR)

( * ) Notice: Subject to any disclaimer, the term of this patent is extended or adjusted under 35 U.S.C. 154(b) by 910 days.

(21) Appl. No.: 10/519,351

(22) PCT Filed: Jun. 27, 2003

(86) PCT No.: PCT/KR03/01263

§ 371 (c)(1),
(2), (4) Date: Dec. 27, 2004

(87) PCT Pub. No.: WO2004/003662

PCT Pub. Date: Jan. 8, 2004

(65) Prior Publication Data

US 2005/0231614 A1  Oct. 20, 2005

(30) Foreign Application Priority Data

Jun. 27, 2002  (KR) .................. 10-2002-0036465

(51) Int. Cl.
*H04N 7/18* (2006.01)
(52) U.S. Cl. ...................... 348/144; 348/143
(58) Field of Classification Search ............. 348/143, 348/144
See application file for complete search history.

(56) References Cited

U.S. PATENT DOCUMENTS 4,983,837 A    1/1991  Cooper et al.
5,663,825 A    9/1997  Amon et al.
6,331,870 B1 *  12/2001  LeCompte .................. 348/144
6,359,681 B1    3/2002  Housand et al.

FOREIGN PATENT DOCUMENTS

| EP | 0 399 180 | 11/1990 |
|----|-----------|---------|
| EP | 0 609 162 | 8/1994  |
| GB | 2 273 413 | 6/1994  |
| WO | 98/03882  | 1/1998  |

OTHER PUBLICATIONS

European Search Report dated Jun. 29, 2007 issued in corresponding European Application No. EP 03 76 1857.
International Search Report for PCT/KR03/01263 dated Oct. 6, 2003.

* cited by examiner

*Primary Examiner*—Allen Wong
(74) *Attorney, Agent, or Firm*—Ostrolenk, Faber, Gerb & Soffen, LLP

(57) ABSTRACT

A FOV(field of view) dependent LOS(line of sight) scan method and apparatus for a turret aided camera system with continuous zoom optics is disclosed. According to this invention, the scan width and rate of the LOS are automatically determined as a function of the FOV selected by the user: scan width=f1(FOV, m) and scan rate=f2(FOV, te) where m is the observation range constant and te is the eye integration time. Moreover, the sensitivity to the FOV can be controlled by adjusting the relevant parameter sets (said m and te), allowing the user to select the scan condition proper to himself. This invention is quite useful for all kinds of turret aided camera system (the IR or day light TV cameras) for reconnoitering application.

10 Claims, 15 Drawing Sheets

<Scan Trajectory>
• SCAN WIDTH = f(FOV)
• SCAN RATE = g(FOV)

forward direction (a) SEU (b) SCP  (c) DSC

METHOD AND APPARATUS FOR SCANNING THE CAMERA LOS IN A CONTINUOUS ZOOM CAMERA SYSTEM

TECHNICAL FIELD

This invention relates to the method and apparatus for an automatic FOV (field of view) dependent LOS (line of sight) scanning in a turret aided continuous zoom camera system.

BACKGROUND ART

Up to the advent of the continuos zoom optics, the step zoom optics (at most 2 to 3 steps) has been widely adopted in a turret aided camera system for reconnaissance and surveillance mission. In that case, an operator empirically and manually determined the LOS scan condition (the scan width and rate) at each FOV. Thus neither the functional relationship of the scan condition and the FOV nor its relevant parametric calibration is seriously required (hereafter this is called the manual LOS scanning method while the current invention is said an automatic one in contrast to the manual one). As long as the step zoom optics is concerned, the manual LOS scanning apparatus may be used without big inconveniences. However, since the continuos zoom optics (>×20 for instance) has recently been developed, it gets more demanding to be applied to a reconnoitering camera system. The application of the manual scanning method to the continuous zoom camera would cause the operator to feel very inconvenient because the operator should select the scan condition proper to the selected FOV, at every FOV. This is why the invention of an automatic FOV dependent LOS scanning apparatus has been developed. The advantages for this invention are introduced here.

DISCLOSURE OF INVENTION

It is an object of the present invention to provide an automatic FOV dependent LOS scanning method and apparatus whose scan condition (the scan width and rate) is automatically determined as a function of the FOV chosen by the operator.

It is another object of the present invention to provide an automatic FOV dependent LOS scanning method and apparatus allowing the operator to select the parameter set (the observation width constant m and the eye integration time $t_e$) proper to himself since everybody usually has a different sensitivity of the scanning to the FOV.

In order to achieve the above-mentioned objects, an automatic FOV dependent LOS scanning method according to the present invention is characterized by as follows:

A method for FOV dependent LOS scanning in a turret aided zoom camera with constant f-number (f/D) where one can change the FOV continuously, wherein the scan width is dependent on the FOV via the relation below:

$$W_s = \pm(m \times FOV)$$

($W_s$ is the scan width and m is the observation width constant)

the mean LOS scan rate during the half period is determined as a function of the FOV via the following relation:

$$\Omega_S = \frac{C_0}{t_e} \cdot \tan\left(\frac{FOV}{2}\right) \sim \frac{C_1}{t_e} \cdot FOV$$

$\Omega_s$ and $t_e$ are respectively the scan rate and the eye integration time. The $C_0$ and $C_1$ are proportional constants)

whereby the LOS scan mechanism is determined based on the said two equations as follows:

$$\left\{\begin{array}{c} \Theta_{SCAZ}(AZ_{LOS}) \\ \Theta_{SCEL}(EL_{LOS}) \end{array}\right\} = \left\{\begin{array}{c} (m \cdot FOV)\sin\left[\frac{\tan\left(\frac{FOV}{2}\right)}{n(t_e) \cdot m \cdot FOV} t\right] + AZ_{LOS} \\ EL_{LOS} \end{array}\right\}$$

($\theta_{SCAZ}$ and $\theta_{SCEL}$ are respectively the azimuth and elevation angles of LOS vector. The $AZ_{LOS}$ ($EL_{LOS}$) are the initial the azimuth (elevation) angle of LOS direction. Meanwhile, the $n(t_e)$ is expressed as $C'/t_e$ with constant C')

In addition, an automatic LOS scanning apparatus according to the invention comprises a turret sensor unit (TSU) including the sensor with variable zoom optics, the mechanical structures and stabilization driver; the multifunctional display unit (MFDU) displaying the image and symbology; the multifunctional control unit (MFCU) interfacing whole camera system with an operator; a system electronics unit (SEU) including a system control processor (SCP), a digital servo controller (DSC), a video interface board (VIF) and a power modules (PWR) wherein the SCP is connected to the other modules, receiving and transmitting all the data in-between the constituent modules and governing the whole camera system, the DSC controls the LOS with the FOV data commanded from the MFCU via the SCP, the VIF generates the symbology related to the sensor data and the PWR supplies all the modules with power; wherein the SCP and DSC include a memory storing the program for the scan process algorithm to determine the scan condition according to the following relations:

scan width=$f_1$(FOV, m); monotonous function of FOV with parameter m scan rate=$f_2$(FOV, $t_e$); monotonous function of FOV with parameter $t_e$, (m is the observation width constant and $t_e$ the eye intgration time)

and a calibration process is also programmed in the same memory allowing the operator to select the FOV sensitivity of the scan condition proper to himself by changing the parameters.

DETAILED DESCRIPTION OF INVENTION

Figure 1A:
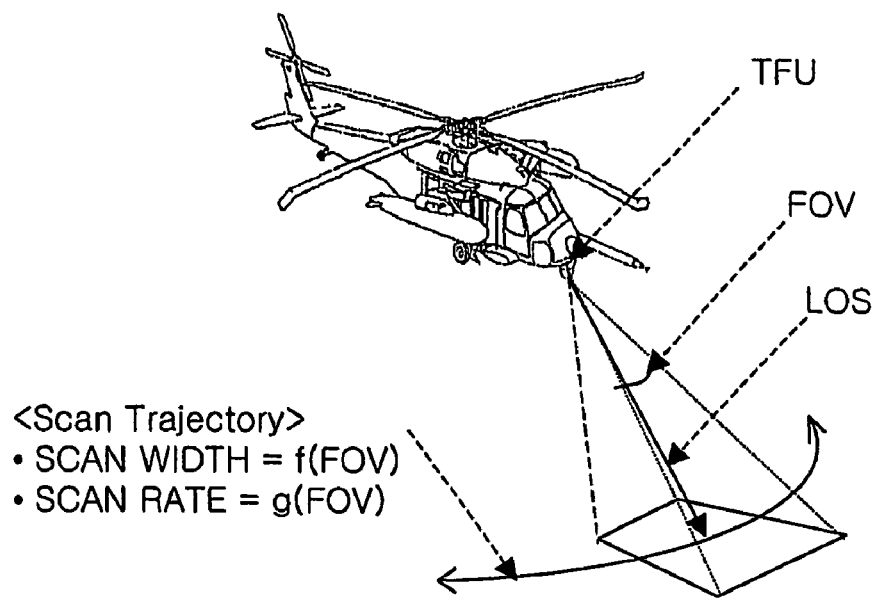
FIG. 1a is a perspective view showing how the helicopter scout is fulfilled, where the camera LOS and its scan trajectory are indicated.

Scanning the camera LOS implies the sweep of the LOS on the azimuth plane with reference to its initial position like the swing of a simple pendulum (see FIG. 1a). The current invention of an automatic FOV dependent LOS scanning method is applicable to any kinds of a turret aided zoom camera system for reconnaissance and surveillance. Its design approach and apparatus implementation are described in the following.

1. Design and Implementation

1) The scan condition (the scan width and rate) is designed to be dependent on the FOV chosen by the operator to maximize the operational efficiency, when-the system level requirements for scout mission should be also considered.

2) At the wide field of view (WFOV), the LOS scan width should meet the field of regard (FOR) of top level requirement. Thus the maximum scan width is determined by the FOR requirement. Namely, scan width=$f_1$(m, FOV) FOR.

3) The degradation in image quality due to the scanning should not be so serious that one can still discriminate the image, which should be limited by checking the field performance (the detection and recognition ranges). This is why the SNR, MTF and MRT performances must be analyzed. On the basis of those analyses, the relationship between the scan rate and the FOV can be derived exactly with the constraint on the image quality; Scan rate=$f_2$(FOV).

4) In addition, the eye sensitivity (so called the eye integration time, $t_e$) is also one of the measures defining the image quality. Thus it plays role of a parameter for controlling the scan rate: Scan rate=$f_2(t_e, FOV)$.

5) Now one can establish the whole expression for the FOV dependent LOS scan mechanism involving the contents of 2) to 4), like the parametric equation form of Scan motion= (Scan width)×sin $\{f_3(m, t_e, FOV), time\}$.

6) As can be seen form the equation in 2) and 4), one can control the slopes of the scan condition to the FOV by adjusting the parameters (the m and $t_e$). The slopes reflect on the sensitivity of the scan condition to the FOV.

2. Theoretical Designs of the FOV Dependent LOS Scan

1) Theoretical Background of SNR, MTF and MRT

The representative quantities determining the image quality are SNR and MTF. The SNR is related to the radiometric performance and the MTF the spatial resolution in the spatial frequency (ν) domain. In real case, the observation object consists of several target components characterized by various different radiometric intensities so that the image quality for the visible camera is usually expressed by $$SNR(\nu) = SNR(0) \otimes MTF_{tot}(\nu) \quad \text{(Equation 1)}$$
$$= \frac{S_V}{N_V} \cdot MTF_{Optics} \cdot MTF_{Motion} \cdot MTF_{others}$$

where SNR(0) is the system SNR for uniform background, $MTF_{tot}$ the system MTF including all the contributions such as the optics MTF ($MTF_{Optics}$), the motional MTF ($MTF_{Motion}$) and others ($MTF_{Others}$) and so on.

As for the visible camera, the incident beam ($L_i$: spectral radiance) on the optics, reflected from the target (reflectance: ρ) transmits through the atmosphere and is then converted into the electronic signal by the detector. In this case, the signal ($S_v$) is proportional to the incident beam intensity, atmospheric transmittance ($\tau_a$), the solid angle (Ω) subtended to the detector pixel, the entrance pupil of the optics (D), the detector responsivity (R) and the optics transmittance ($\tau_D$). Hence, the $S_v$ is expressed by $$S_V = \tau_a \int L_i(\lambda, \rho) \left(\frac{p}{f}\right)^2 \cdot \pi \left(\frac{D}{2}\right)^2 \cdot \tau_0 \cdot R(\lambda) \cdot d\lambda \quad \text{(Equation 2)}$$

where the p, f and λ are the pixel size, the focal length and the light wave length, respectively. The SNR ($SNR_C^{vis}$) due to the reflectivity difference ($\Delta \rho = \rho_T - \rho_B$) of the target to the background is expressed by $$SNR(0)_C^{vis} = \frac{\tau_a \int [L_i(\rho_T) - L_i(\rho_B)] \left(\frac{p}{f}\right)^2 \pi \left(\frac{D}{2}\right)^2 \tau_0 \cdot R(\lambda) \cdot d\lambda}{N_V} \quad \text{(Equation 3)}$$
$$= \frac{\Delta\rho}{N_V} \cdot \tau_a \int \frac{\partial L_i(\lambda, \rho)}{\partial \rho} \left(\frac{p}{f}\right)^2 \cdot \pi \left(\frac{D}{4}\right)^2 \tau_0 R(\lambda) \cdot d\lambda$$

In the meantime, the noise equivalent reflectance difference (NE Δ ρ), defined as the Δ ρ satisfying SNR(0)=1 with $\tau_a=1$ in the equation 3, is derived to $$NE\Delta\rho = \frac{N_V \cdot 4\left(\frac{f}{D}\right)^2}{\pi p^2 \int_{\lambda_1}^{\lambda_2} \left(\frac{\partial L_i(\lambda, \rho)}{\partial \rho}\right) \cdot \tau_0 \cdot R(\lambda) \cdot d\lambda} \quad \text{(Equation 4)}$$

Thus, $SNR(\nu)_C^{vis}$ becomes $$SNR(\nu)_C^{vis} = \tau_a \frac{\Delta\rho}{NE\Delta\rho} \cdot MTF_{tot}(\nu) \quad \text{(Equation 5)}$$

According to the equation 4, no matter how the focal length f is varied, the NE Δ ρ will remain unchanged under the situation of constant f-number (f/D).

Likewise, the contrast SNR ($SNR_C^{IR}$) for an IR camera is derived to show almost the same expression as the equation 5 except for the source of the incident beam: $L_i=L_i(\lambda,T)$ instead. The contrast SNR($SNR_C^{IR}$) due to the temperature difference of target to background ($\Delta T=T_T-T_B$) is given by $$SNR(v)_C^{IR} = \tau_a \frac{\Delta T}{NE\Delta T} \cdot MTF_{tot}(v) \quad \text{(Equation 6)}$$

where $NE\Delta T$ is the noise equivalent to temperature difference. The physics of the equations 2 to 6 means that the SNR for the camera with constant f/D remains constant irrespectively of the change in the focal length whatever the f may be changed. Namely, the image contrast for such camera is determined only by the MTF performance.

In the meantime, the barely measurable $\Delta T$ through the monitor is called as MRT (the minimum resolvable temperature difference), which includes even s the human factor. Rearranging the equation 6 for MRT, it may be expressed as $$MRT = 0.98 \frac{SNR_{th} \cdot NE\Delta T \cdot v}{MTF_{tot}(v) \cdot v_N} \cdot \left(\frac{\alpha}{7n'}\right)^{1/2}; \quad n' = \frac{2t_e}{3t_{frame}} \quad \text{(Equation 7)}$$

where $SNR_{th}$ is the threshold SNR ($SNR_{th}=2.28$), the n' the constant, the $t_e$ the eye integration time (0.05~0.2 s), the $t_{frame}$ the frame time. The $v_N$ and $\alpha$ are respectively Nyquist frequency and the pixel aspect ratio. Even the equation 7 predicts the same features as those for the equation 5 and 6: saying again, for the zoom camera with f/D=constant, the image contrast is related only to the MTF.

2) The Scan Width from the Requirement and Mission Analyses

Figure 2:
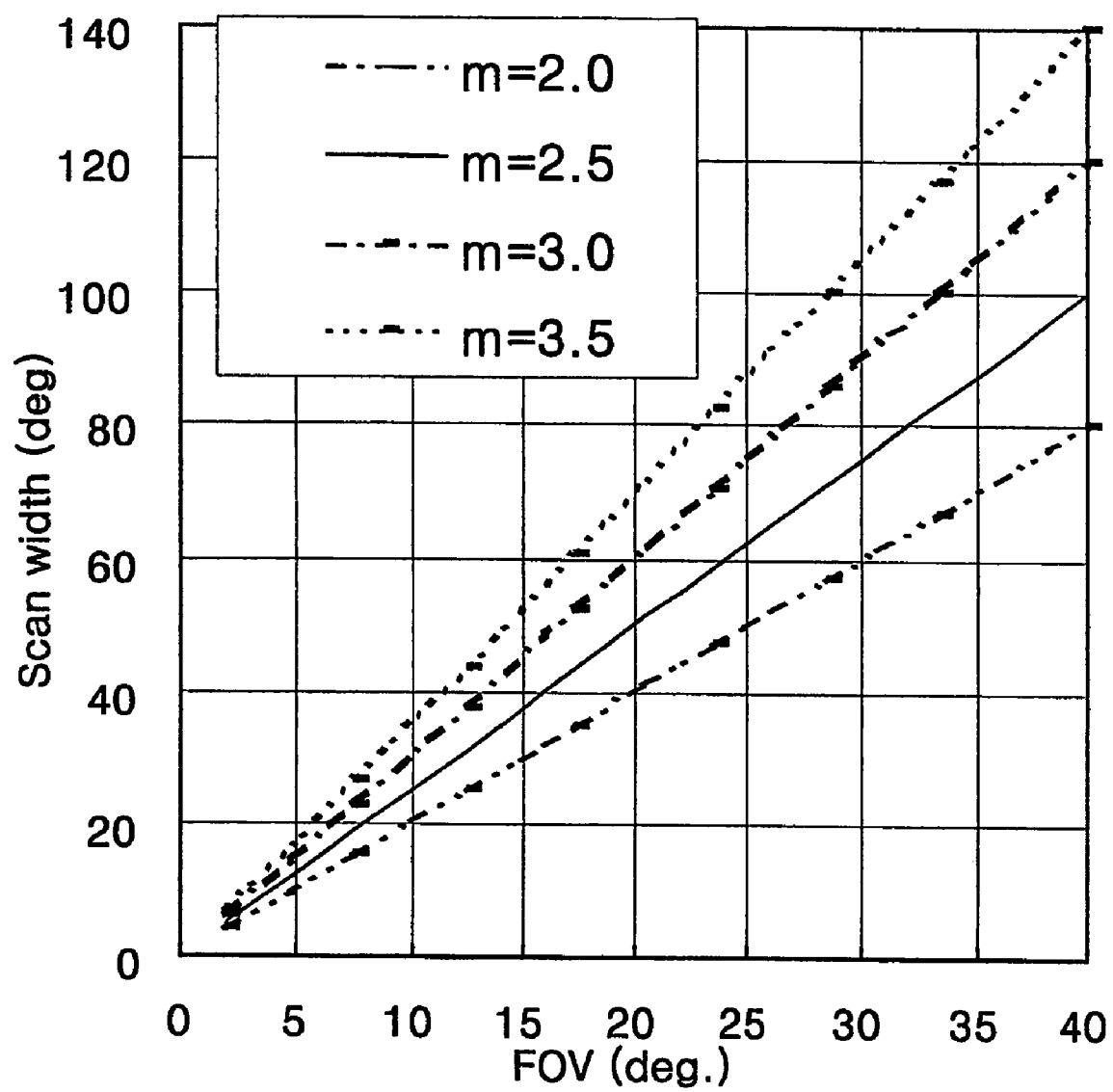
FIG. 2 shows the FOV dependence of the scan width.

Considering the physical meaning of the observation FOR being the top-level requirement, the scan width ($W_s$) of the camera LOS is expressed as $$W_s \pm (m \times FOV) \quad \text{(Equation 8)}$$

where the m is the observation width constant and its range is determined by the field of regard (FOR), one of the system requirement. In order to observe entire directions of 360° (i.e., FOR =±180°) at WFOV=40°, one has to rotate the LOS from −160° to +160°, resulting in the m=4. The condition of m=1 has no meaning because of too narrow scan width, and thus m ranges around 2.0 to 4.0. The equation 8 means that the scan width is proportional to the FOV (see FIG. 2).

3) The Scan Rate from SNR, MTF and MRT Performance Analyses

The analyses in section 1) reveals that the SNR for the camera with constant f/D would remain constant, irrespectively of the change in f. If there is additional LOS scanning motion, it will affect on the image quality via the MTF degradation, especially only for the $MTF_{Motion}$ in the equation 1. However this degradation is to some extent compensated due to the shortening in focal length (the enlarging in FOV), which is one of the key points in this invention. The MTF degradation due to the scan motion is expressed by the following $$MTF_{Motion} = \sin c(\pi \cdot v_{sc} \cdot t \cdot v) \quad \text{(Equation 9)}$$

$$v_{sc} = c\frac{dp}{dt}$$

$$= c\frac{dT_y}{dt} \cdot \frac{f}{R}$$

$$= V_{sc} \cdot \frac{f}{R}$$

(c: constant)

where the $v_{sc}$ and t are respectively the scan speed of the focal length vector and the relevant time duration. The $T_y$ and $V_{sc}$ are in turn the y-component of ground plane pixel and the scan speed of LOS (see FIG. 3a). As can be seen from the equation 9, one can limit the degradation in image quality by maintaining $MTF_{Motion}$=constant (in special $v_{sc}$=constant).

Figure 3B:
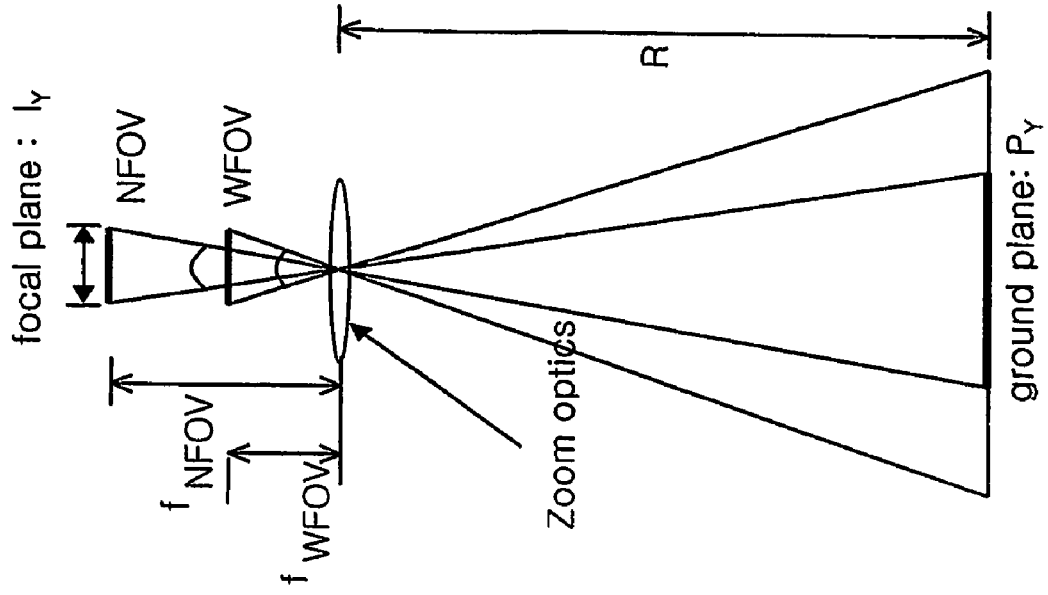
FIG. 3b illustrates the relationship of the focal plane and ground plane shown at two different focal lengths i.e., $f_{NFOV}$ and $f_{WFOV}$.
Figure 3A:
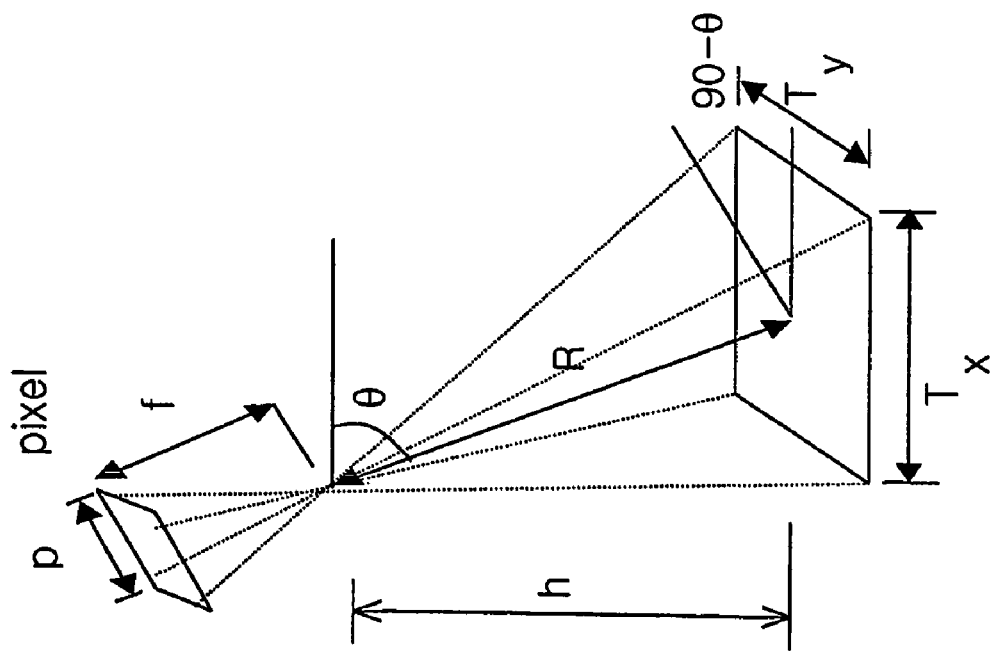
FIG. 3a shows the relationship of the focal plane in the camera and the plane projected on ground.
Figure 4:
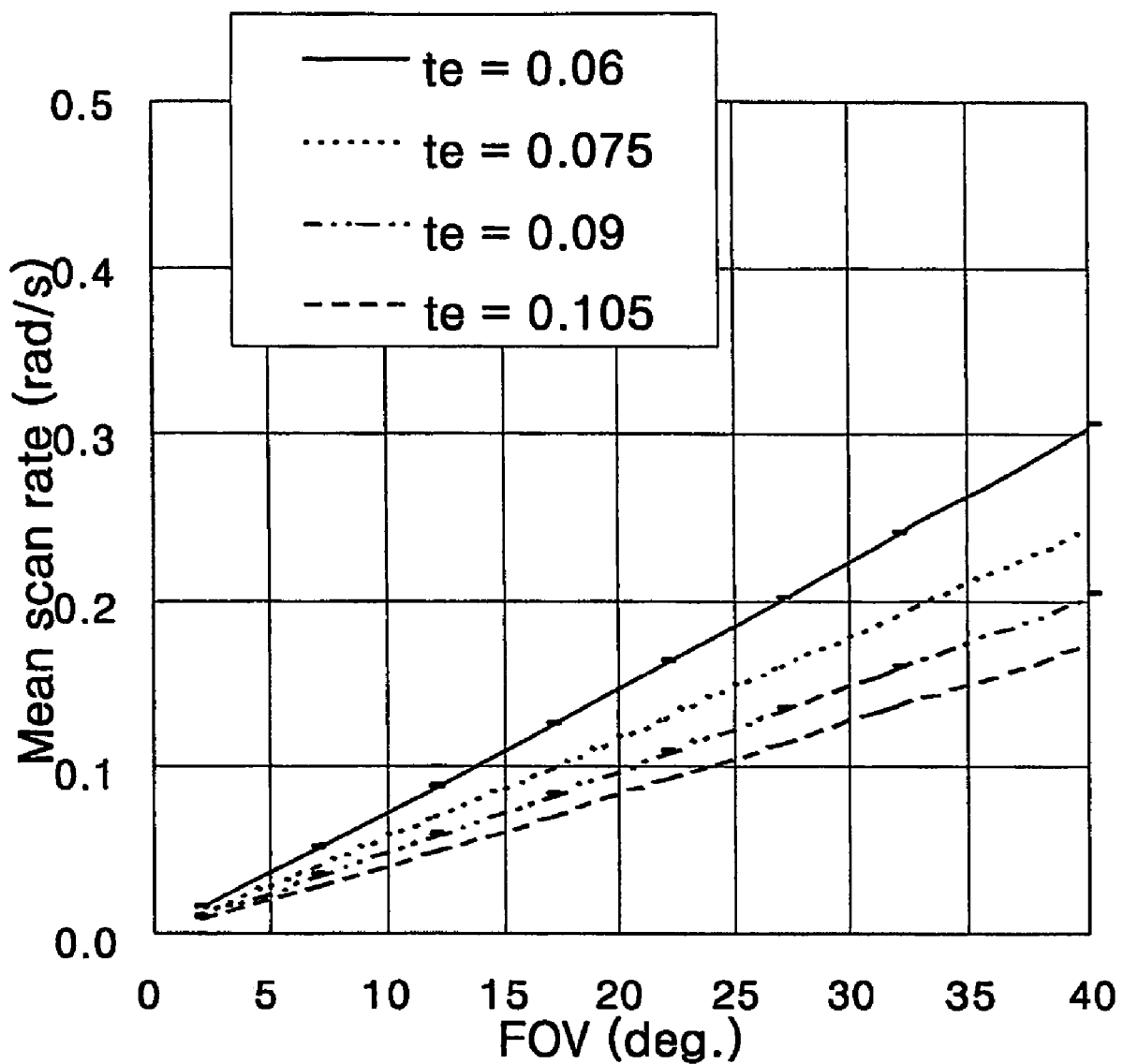
FIG. 4 shows the FOV dependence of the mean scan rate.

From the relation of the focal length and the FOV shown in FIG. 3, the scan speed of the camera LOS, $V_{sc}$, can be derived and subsequently the scan rate is given by $$\Omega_S = \frac{V_{SC}}{R} = \frac{cp}{t_{intg}} \cdot \frac{1}{2 \cdot \tan\left(\frac{FOV}{2}\right)} \quad \text{(Equation 10)}$$

$$= \frac{C_0}{t_e} \cdot \tan\left(\frac{FOV}{2}\right)$$

where the integration time $t_{intg}$ can be converted into the eye integration time $t_e$ from the engineering viewpoint. The equation 10 means that the scan rate is almost linearly proportional to the FOV (see FIG. 4). The $C_0$ includes all the constants (c, n', $l_y$, p, $t_e$) in the equation 10.

4) The LOS Scanning Mechanism for Servo Control

The initial reference positions (the elevation and azimuth angles) may be set by the same values as those in the previous mode or by the command manually made with the joystick even in the scan mode. In the meantime, the scan motion can be implemented by the servo controller in function of sine or cosine, like the following equation.

$$\Theta_{scan} = A \sin(\omega \cdot t + \psi) \quad \text{(Equation 11)}$$

The average scan rate during the half period is given by $$\frac{2}{T} \cdot \int_{-\frac{T}{4}}^{+\frac{T}{4}} \left[\frac{d\Theta_{scan}}{dt}\right] dt = \frac{4A}{T} = \Omega_S \quad \text{(Equation 12)}$$

From the equation 12, the $\omega$ in the equation 11 can be obtained as follows:

$$\omega = \frac{\pi}{2} \cdot \frac{\Omega_S}{A} = \frac{\pi \cdot C_0}{2 \cdot t_e} \cdot \frac{\tan\left(\frac{FOV}{2}\right)}{m \cdot FOV} \quad \text{(Equation 13)}$$

Since the function of tan(FOV/2) in equation 13 is almost linear to the FOV in the range of FOV<40°, one can see that the $\omega$ is almost constant in the whole FOV range. Hence, the servo control mechanism implies that the camera LOS scans automatically with the width and rate set as a function of the FOV, which can be expressed by $$\begin{Bmatrix} \Theta_{SCAZ}(AZ_{LOS}) \\ \Theta_{SCEL}(EL_{LOS}) \end{Bmatrix} = \qquad \text{(Equation 14)}$$

$$\begin{Bmatrix} (m \cdot FOV)\sin\begin{bmatrix} \dfrac{\tan\left(\dfrac{FOV}{2}\right)}{n(t_e) \cdot m \cdot FOV} t \end{bmatrix} + AZ_{LOS} \\ EL_{LOS} \end{Bmatrix}$$

where the $AZ_{LOS}$ and $EL_{LOS}$ are the reference values of the azimuth and elevation angles, respectively.

Figure 5:
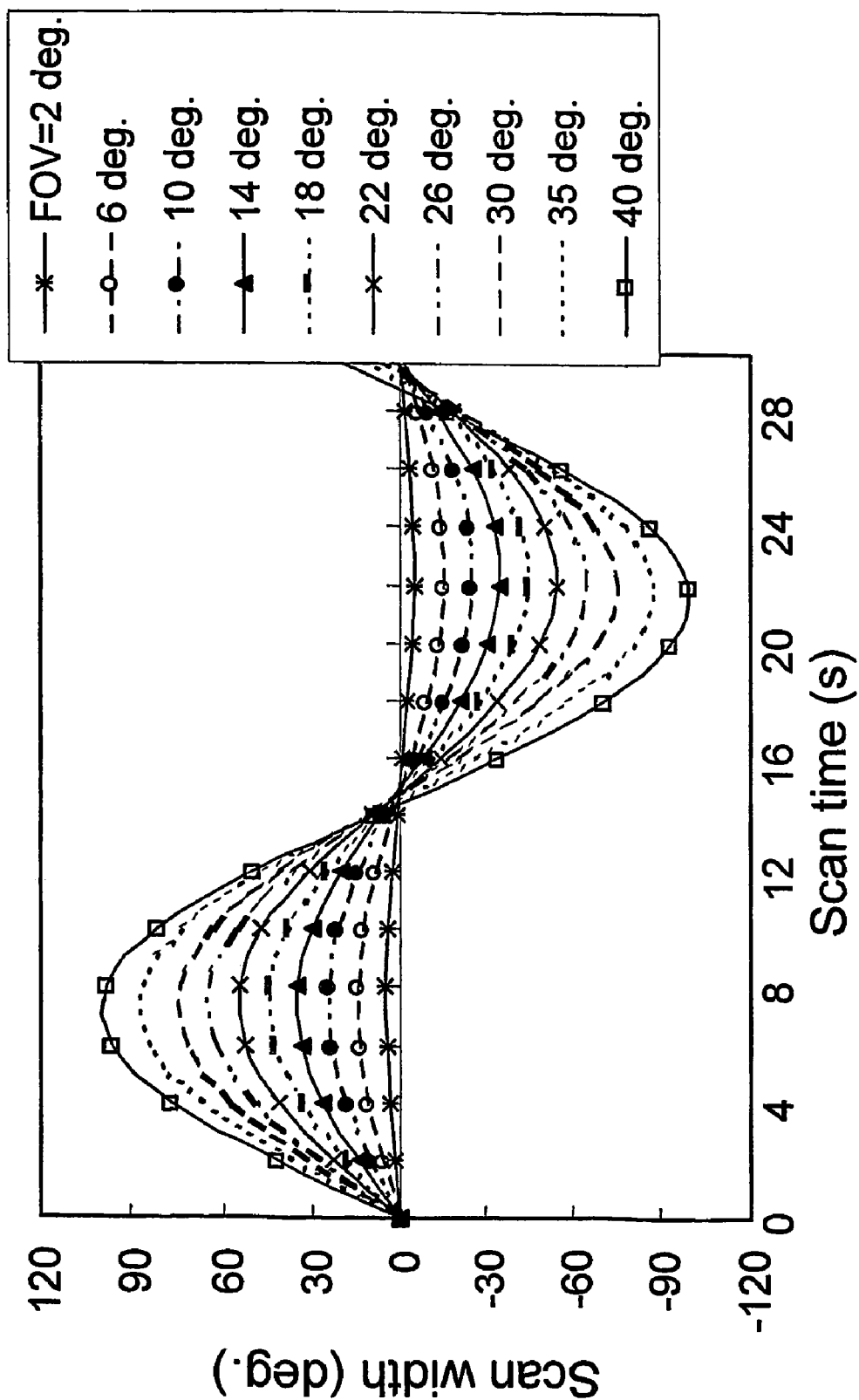
FIG. 5 shows the scan profile ($t_e$=0.075) plotted as a function of the FOV.

The reference positions of the scan may be set by the elevation and azimuth angles in the previous mode or by the command manually made with the joystick even in the scan mode. Saying again the features of this invention with the equation 14, that the function of tan(FOV/2) is linearly proportional to the FOV in the range of FOV/2<20°, and the scan period is almost constant in the whole FOV range accordingly (see FIG. 5).

3. Implementation of a LOS Scanning Apparatus

The present invention is explained by introducing the HFLIR (heli-borne FLIR system) as an example, but can be applied to any kinds of the turret aided zoom camera system whether it uses visible or IR beams.

Figure 1B:
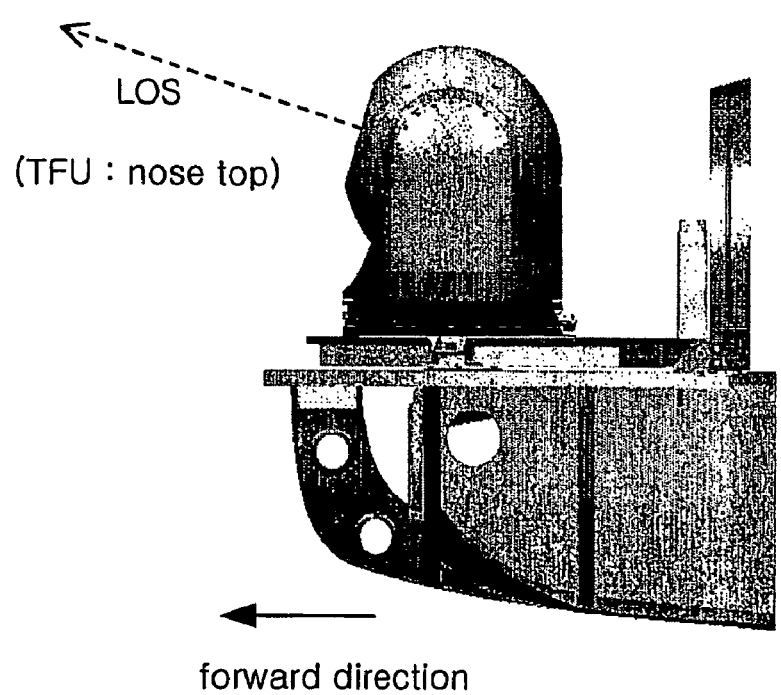
FIG. 1b is a side view of TFU (turret FLIR unit) mounted onto the nose of LYNX helicopter.

FIG. 1a is the perspective view showing how the LOS of a camera (called HFLIR) scans for scout using helicopter and FIG. 1b is the side view of a TFU mounted onto the nose of a LYNX helicopter. The TFU changes its LOS direction by rotating the turret unit around both the elevation and azimuth angle axes.

1) Apparatus Components

Figure 6:
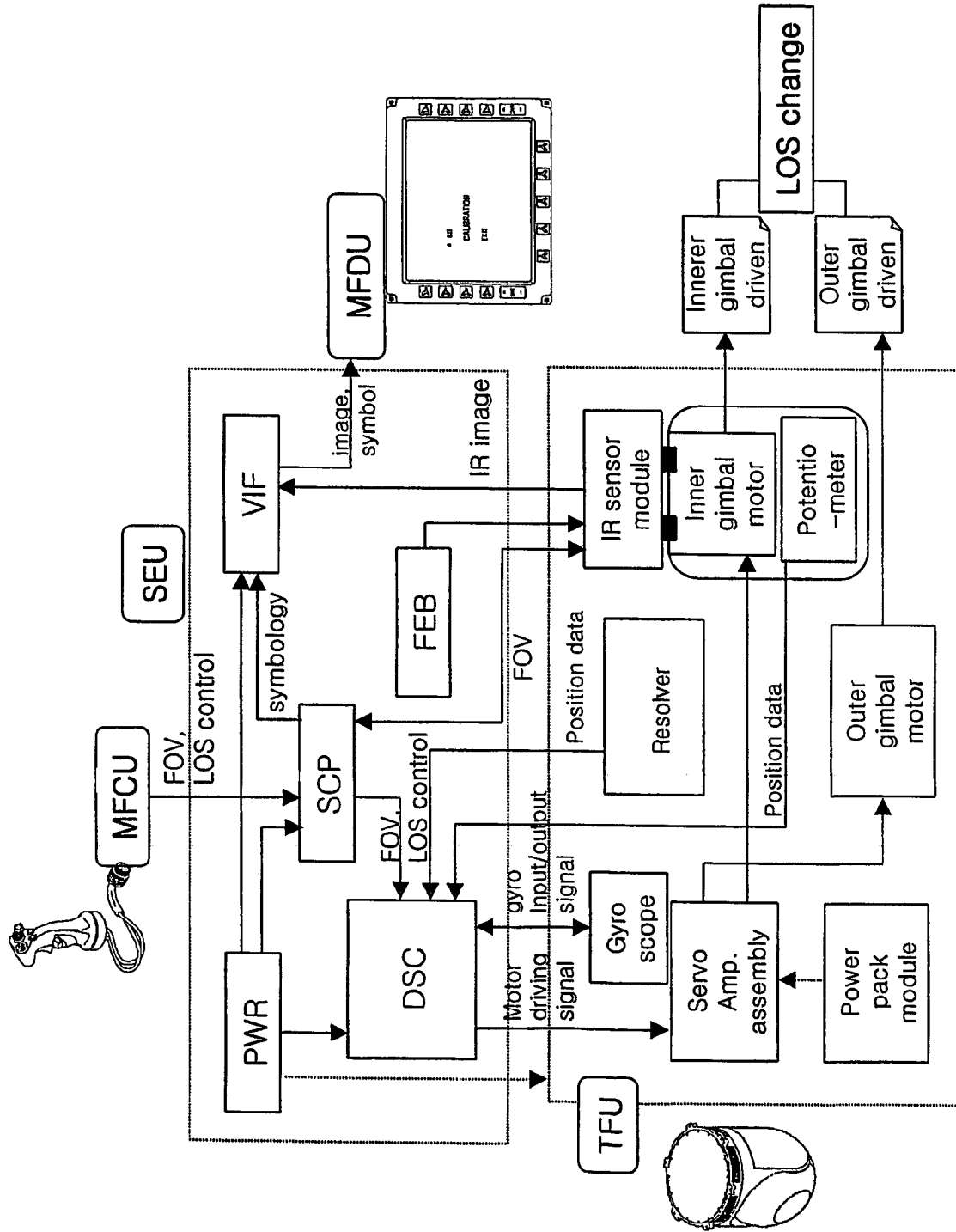
FIG. 6 shows a functional diagram of the turret aided camera system where the current invention is applied.

FIG. 6 shows the all the components in HFLIR where this invention is actually adopted. In this figure, HFLIR consists of four different line replaceable units (LRUs) such as the multi-functional display unit (MFDU), the multi-functional control unit (MFCU), the system electronics unit (SEU) and the turret FLIR unit (TFU).

The MFDU displays the IR image and all the symbology including the character and the numerical values. The MFCU interfaces the operator with the whole HFLIR system.

The SEU has five different boards such as the system control processor (SCP), the digital servo controller (DSC), the video interface board (VIF), the power board (PWR) and the FLIR electronics power board (FEB).

The SCP is connected to all the other modules, receiving and transmitting all the data in-between the constituent modules and governing and managing the HFLIR, like a cerebrum in the human brain. The DSC controls the LOS of TFU with the FOV data received from the SCP and the VIF generates the symbology (the FOV, the LOS direction, etc.) received from the SCP and display them together with the IR image coming from the IR sensor module. The PWR and FEB supply all the modules with power.

The TFU consists of the IR sensor module, the mechanical structures and stabilization driver. The mechanical structure includes the 4-axes inner and outer gimbals. The inner and outer gimbals are rotated with the help of the motor around the elevation and azimuth axes. The potentiometer, the gyroscope and the motor are mounted onto the inner gimbal to which the outer one with the resolver is slaved. The stabilization driver consists of the servo amplifier module and the power pack module (see FIG. 9).

The functional relationship of all the modules is shown in FIG. 6, which can be explained as follows. If the operator gives a command of the LOS change by the MFCU, this command is transmitted to the DSC via the SCP, giving rise to a gyro-driving signal. This signal is input to the gyroscope in the TFU and its output signal is fed back to the DSC to generate a command which is then amplified by the servo-amplifier module enough for driving the inner gimbal motor. The potentiometer is used to measure the difference in the position between the inner and outer gimbals. The measured position difference is transmitted to the DSC that generates the signal as much as the rotation of the inner gimbal. This signal is also amplified by the servo-amplifier module and is then fed to derive the outer gimbal motor. At the same time, the resolver measures the position change of the outer gimbal and transmits it to the DSC. Using these functions, the operator can change the LOS of the TFU.

Figure 7:
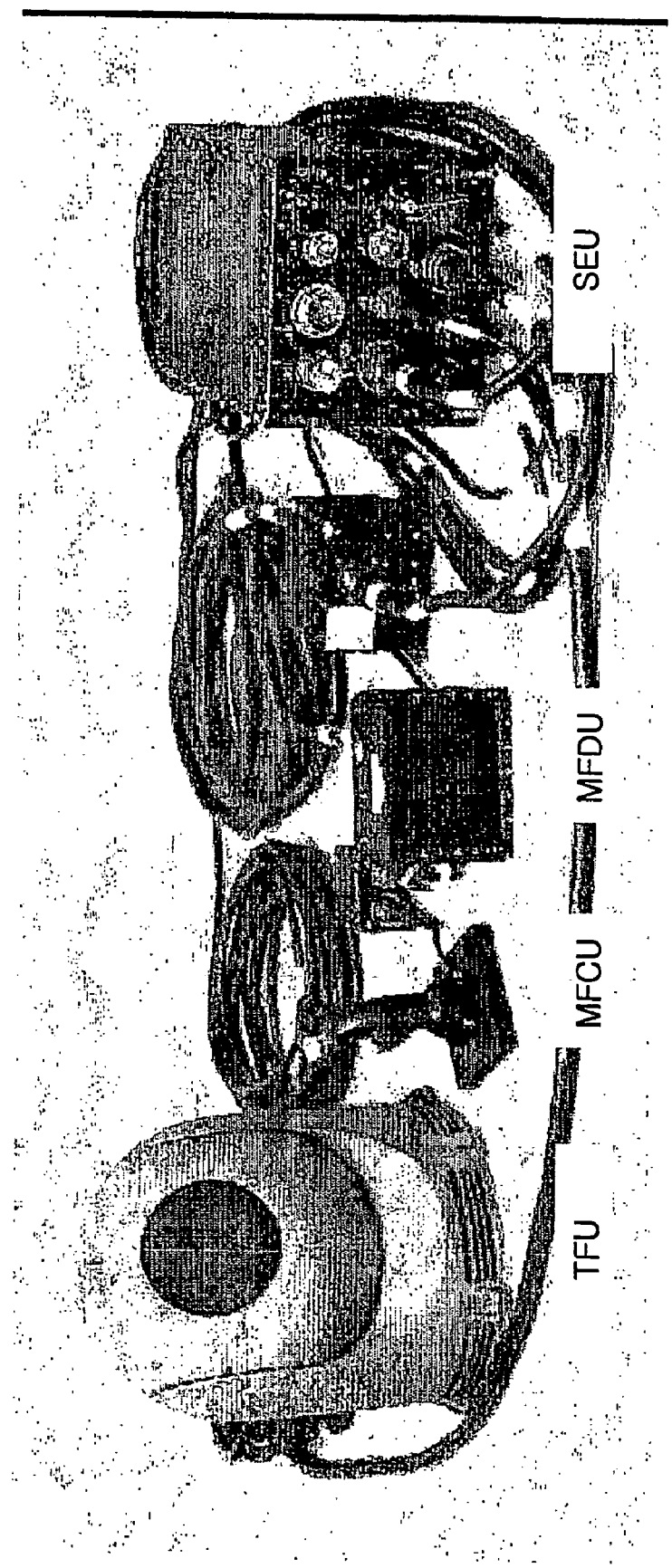
FIG. 7 is a picture of HFLIR system where this invention is applied, comprising all told four LRUs such as the TFU, SEU, MFDU and MFCU.
Figure 8:
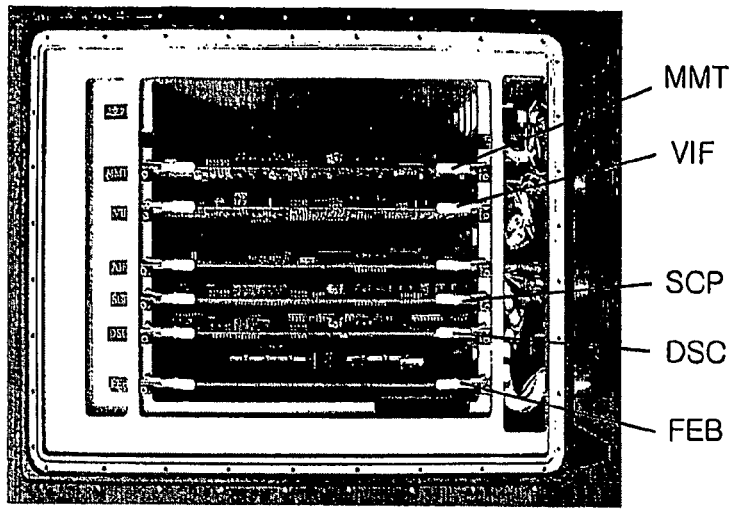
FIG. 8 is a picture of SEU, one of four LRUs in HFLIR where the flash memories are indicated.
Figure 8:
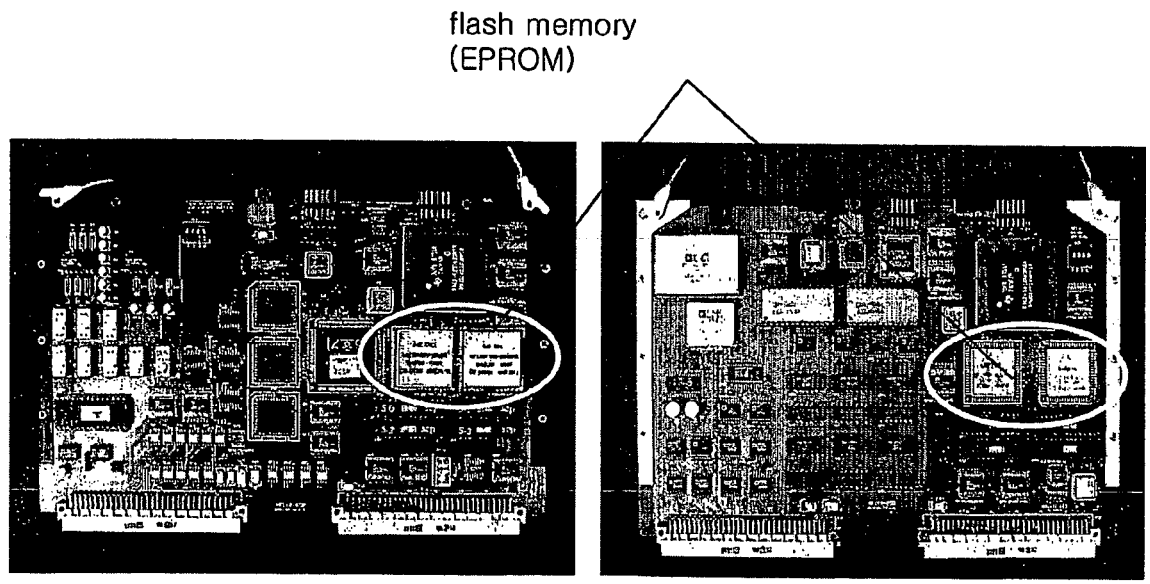
Figure 9:
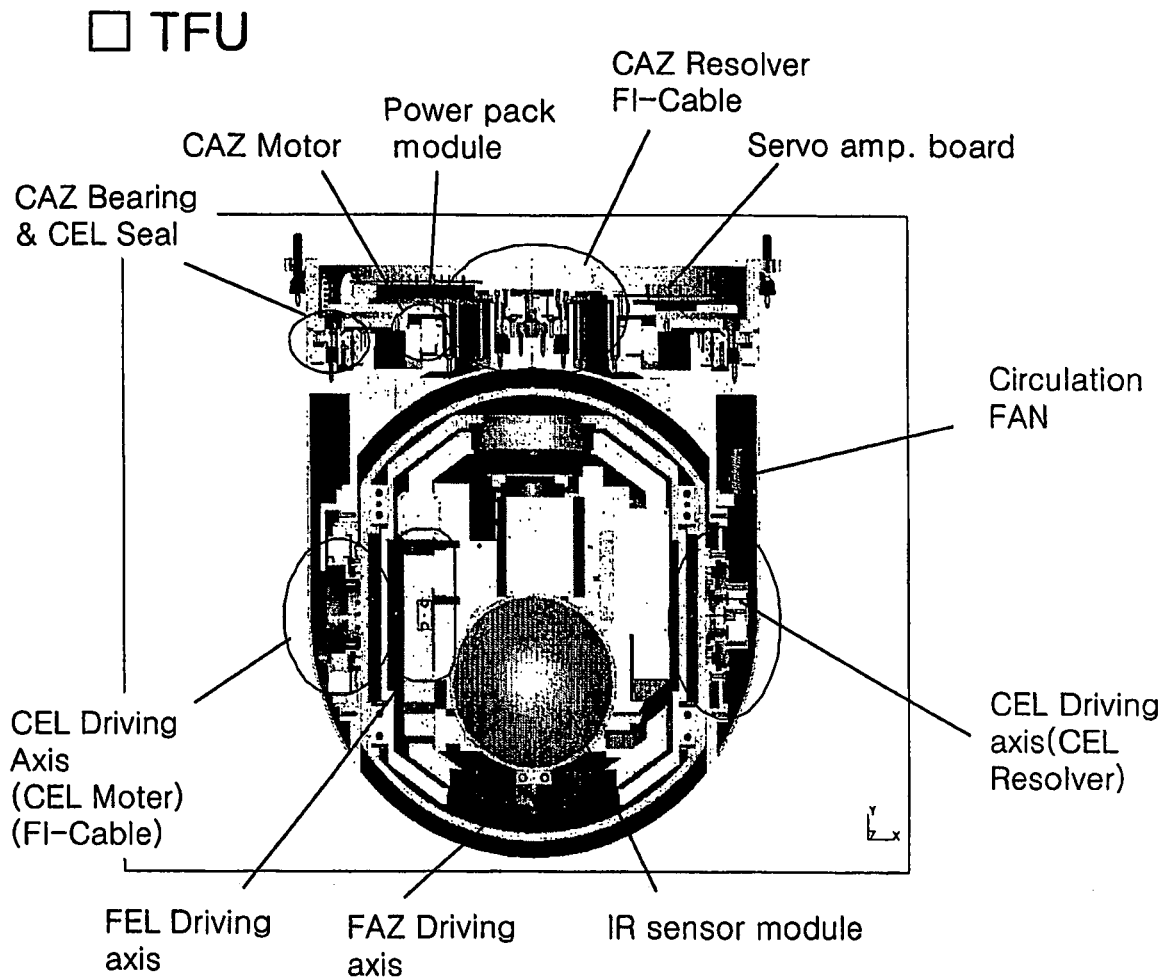
FIG. 9 is a picture of TFU and its components.
Figure 9:
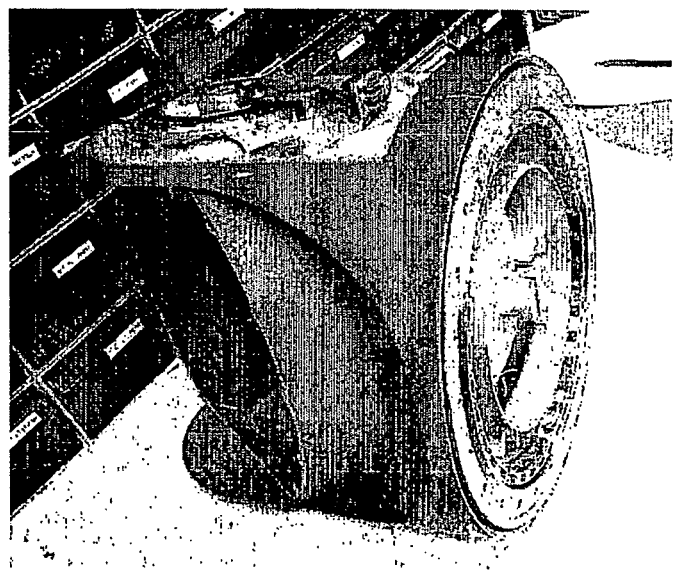

FIG. 7 shows the fabricated HFLIR, which has been mounted on the three different kinds of helicopter such as Super-LYNX, UH-60 and HH-47. FIG. 8 shows the pictures for the SEU and its constituent electronic boards, where the SCP and the DSC are shown in more detail. FIG. 9 depicts the TFU.

The functional relationship of all these modules is explained in the following section by establishing the FOV dependent LOS scanning mechanism of the equation 14. According to this process, the FOV dependent LOS scanning is fulfilled.

2) Scanning Process

The scan process can be made on the basis of the functional block diagram shown in FIG. 6, which is done as follows.

Figure 10A:
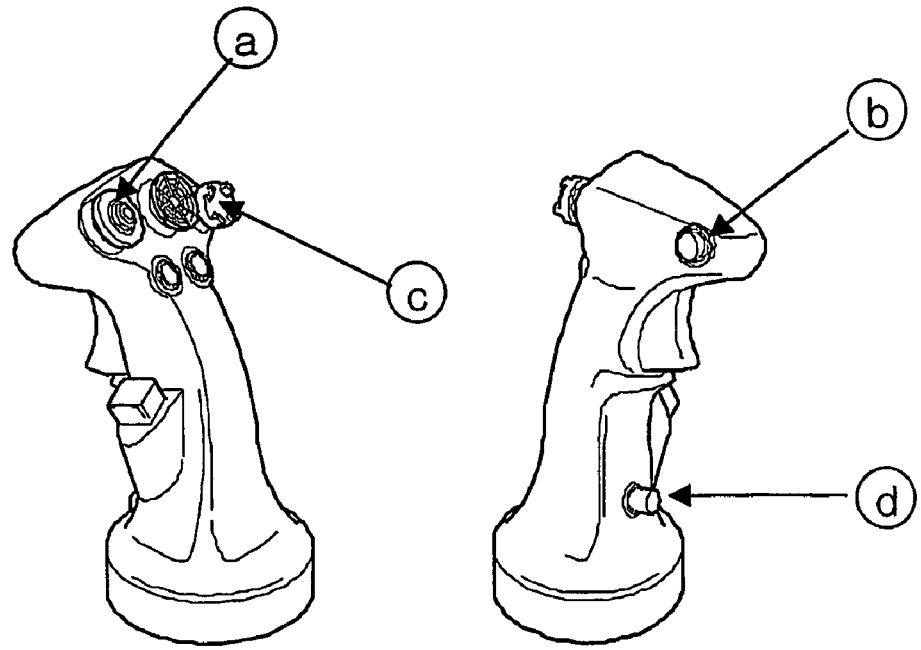
FIG. 10a is a perspective view of MFCU wherein a few numbers indicating some control keys are shown.
Figure 10B:
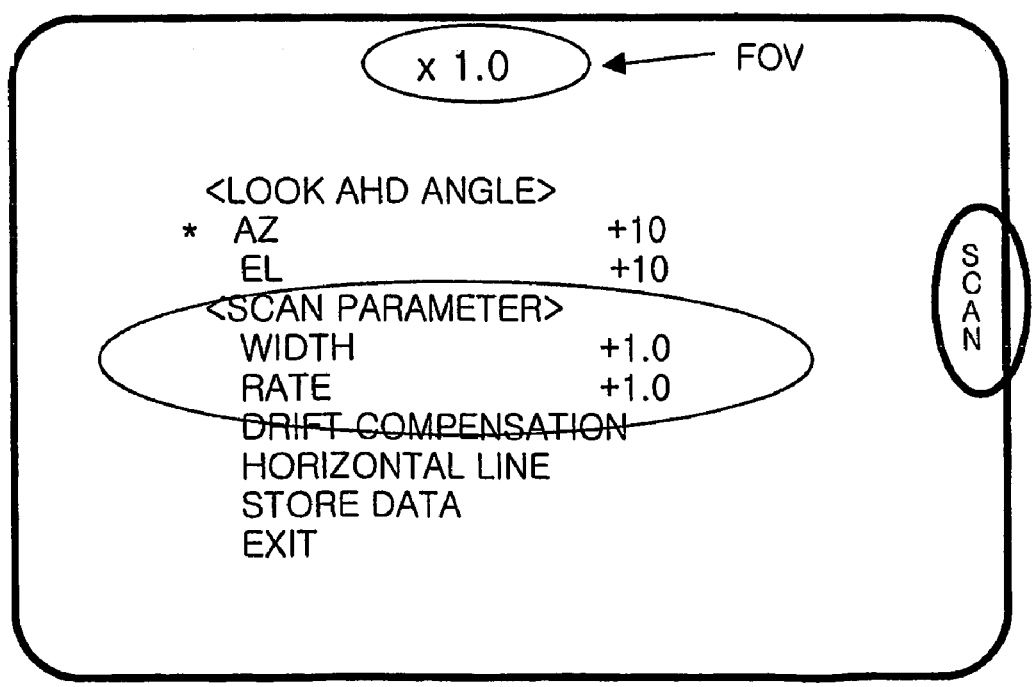
FIG. 10b is a picture showing the calibration page on the monitor (MFDU) through that the user can select the scan parameter sets (SCAN WIDTH, RATE).

① The operator initiates the scan mode by executing the SCAN displayed on the monitor with the MFCU or directly by pushing the relevant button (see FIG. 10b).

② When controlling the FOV key allocated on the MFCU, this command is transmitted to the IR sensor module via the SCP so that the camera FOV is changed accordingly. The current FOV datum is also displayed on the monitor to notice it to the operator (see FIG. 10b).

③ The IR sensor module transmits the FOV datum to the DSC via the SCP.

Figure 11:
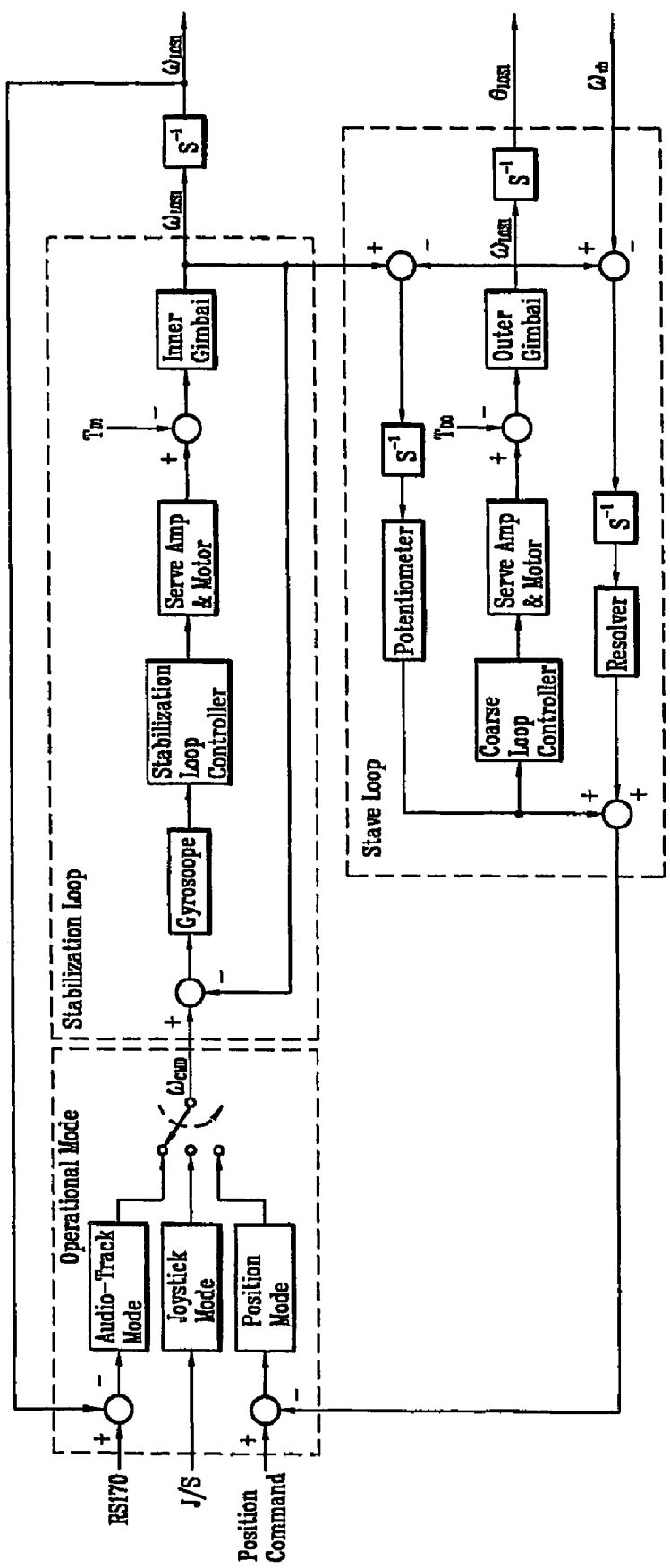
FIG. 11 is a typical-block-diagram of servo controller.

④ In the DSC, the scan condition (Scan width=$f_1$(m, FOV) and Scan rate=$f_2(t_e, FOV)$) dependent on the FOV is fed to the position loop (see FIG. 11). The initial reference angles follows those set in the previous mode or the commands made from the joystick, which is also fed to the position loop. Although the scan mode is going, the operator can change the LOS reference by giving the manual command with joystick (see FIG. 11)

⑤ The scan and manual commands controlling the LOS are input to the gyroscope in the stabilization loop to make the deviation from the inertial plane, making the stabilization controller to derive the inner gimbal motor to minimize this deviation (see FIG. 11).

⑥ In the slave loop controller, the potentiometer measures the position difference of the outer gimbal from the inner one, and then renders the outer gimbal to rotate as much as that difference (see FIG. 11).

⑦ The position of the outer gimbal is measured by the resolver which is then compared to the LOS command of the scan mechanism in the position loop. The position loop repeats the process of ④~⑥ (comparing the two values and minimizing their difference) until the difference is nulled.

⑧ In addition to the process above, the operator can select the scan parameters (m, $t_e$) suitable for himself through the calibration mode, that is to say, the sensitivity of the scan condition to the FOV can be set by selecting them proper to the operator (see FIG. 10).

⑨ When exiting the calibration page shown in FIG. 10, the turret servo mode is reset into the manual mode. Execute the scan mode again in order to start the LOS scanning with new parameters. If the FOV is changed during the scan motion, the scan condition is subsequently changed.

Figure 12A:
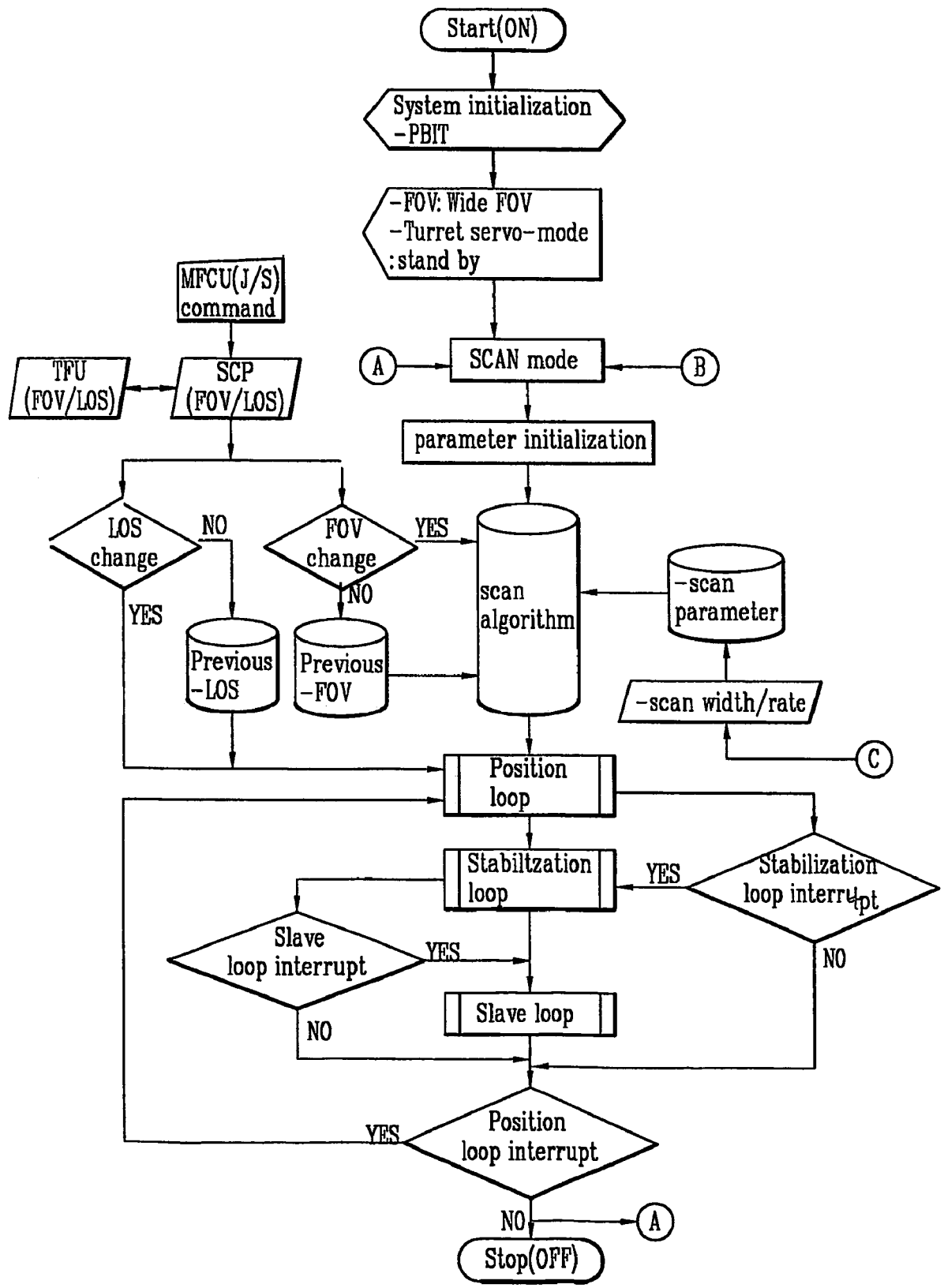
FIG. 12 is a flow chart illustrating how to do the LOS scanning process of this invention.
Figure 12B:
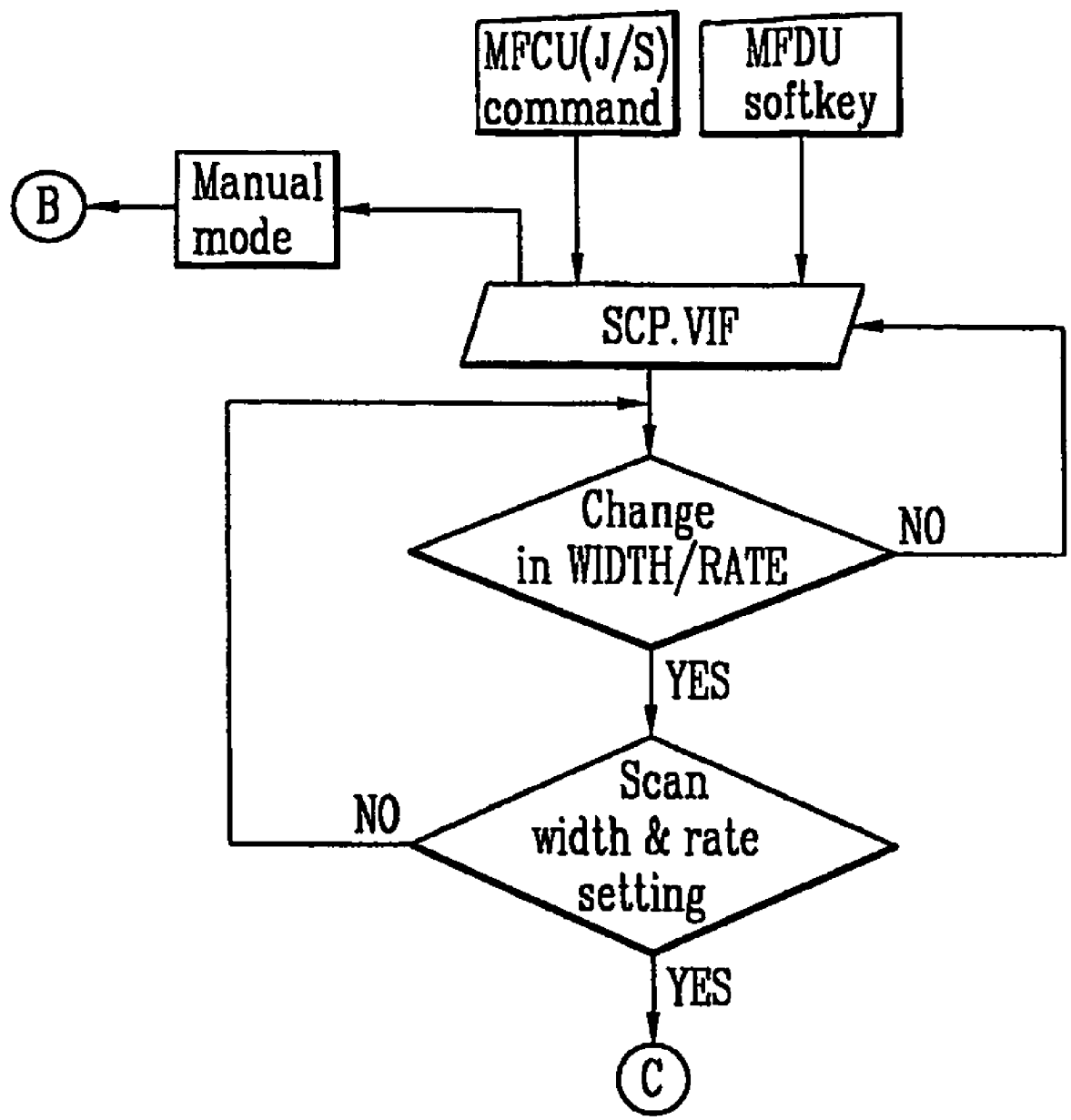

FIG. 12 shows the flow chart made according to the scan process mentioned above.

3) Calibration of the Scan Parameters

It is necessary for the operator to calibrate the scan width and rate by setting the scan parameters (m, $t_e$) proper to the operator through the calibration mode. To do this, the joystick or keyboard as well as the monitor are needed. As for HFLIR, the MFCU and MFDU were used (see FIG. 10a).

For the case of the heli-borne FLIR, it is desirable to allocate the FOV control key on the MFCU for the pilot's convenience during the flight. Hence, when controlling the FOV, the scan process automatically determines the scan width and rate. Since the operator may generally prefer the sensitivity of the scan condition to the FOV proper to himself, he can calibrate it before taking off for scout. Thus the calibration mode is necessarily made for the operator to choose the sensitivity suitable for himself.

Using the calibration mode, the operator can select the m and $t_e$ in the calibration page displayed on the monitor (see FIG. 10b). In this figure, the scan parameter <SCAN PARAMETER> has two parameters of WIDTH and RATE. The WIDTH and RATE correspond to the observation width constant (m) and the eye integration time ($t_e$), respectively. These two correspondences have the proportional relationship, which is also coded and stored in the flash memory on the SCP and is hidden implicitly. The operator can see just the WIDTH and RATE instead of the m and $t_e$. Here, the m=2.5 and $t_e$=0.075 s is set as the typical case (that is to say, WIDTH=1 and RATE=1) and the increments for the parameters are simplified with reference to the typical case (see Table 1).

The calibration method for HFLIR is as follows. The operator generates the cursor * in the calibration page by pushing the ⓑ key in the MFCU and move the * to the ⓔ WIDTH or ⓕ RATE by pushing ⓒ key up or downward. Lastly the operator executes the item with cursor by pushing ⓓ key of the MFCU to make it twinkling. During the cursor's twinkling, he can select a certain value in the rage of +1.4~+0.8 with the ⓑ key. Then, pushing ⓓ key stops its twinkling, which means storing the selected scan parameter. In the meantime, the relation of WIDTH and m as well as that of RATE and $t_e$ is summarized in table 1. As shown in this table, m=2.5 corresponds to WIDTH=+1.0 and $t_e$=0.075 s does RATE=+1.0.

TABLE 1

Relationship of WIDTH and m, RATE and $t_e$

| Scan width | | Scan rate | | |
|---|---|---|---|---|
| M | WIDTH | $t_e$(sec) | RATE | comment |
| 3.5 | 1.4 | 0.105 | 1.4 | |
| 3.0 | 1.2 | 0.09 | 1.2 | |
| 2.5 | 1.0 | 0.075 | 1.0 | Typical case |
| 2.0 | 0.8 | 0.06 | 0.8 | |

In FIG. 8a and 8b, the integrated circuits (ICs) expressed by circles are the flash memory of EPROM function. In the scan process flowchart shown in FIG. 12, the open area is programmed in the flash memory on the SCP (FIG. 8a) and the shaded area is in the flash memory on the DSC (FIG. 8b).

4. Test and Evaluation Results

Figure 13A:
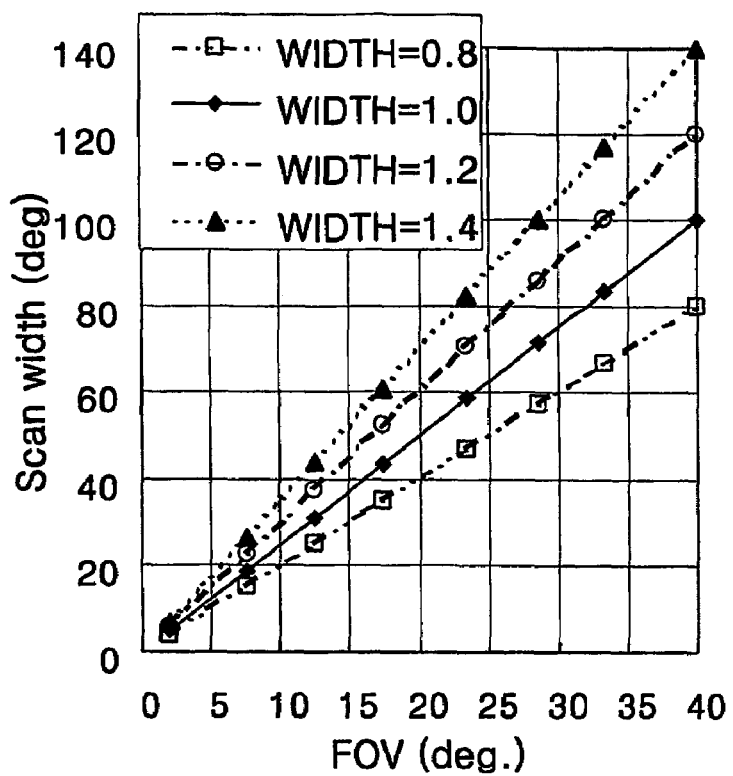
FIG. 13a shows the scan width measured at several FOVs for the case of HFLIR.
Figure 13B:
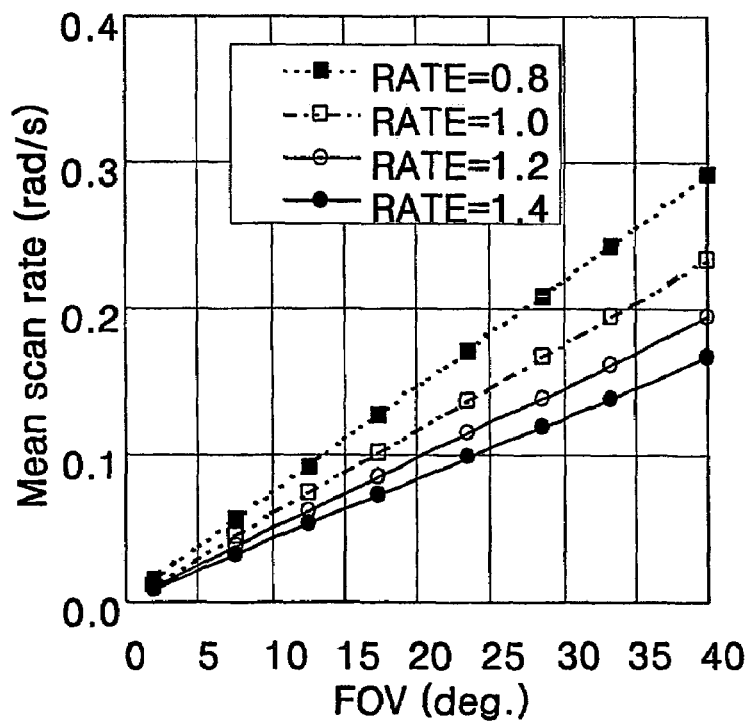
FIG. 13b shows the scan rate measured at several FOVs for the case of HFLIR.

FIG. 13a and 13b respectively shows the scan width and mean scan rate measured as a function of the FOV, by identifying the IR image with good quality displayed on the MFDU.

The datum points for the scan width were measured proportional to the FOV, as the design (solid line) of the equation 8. The data are proved to be consistent with the design within the experimental error. The measured mean scan rate also turned out to comply with the design (solid line) of the equation 10.

Figure 14A:
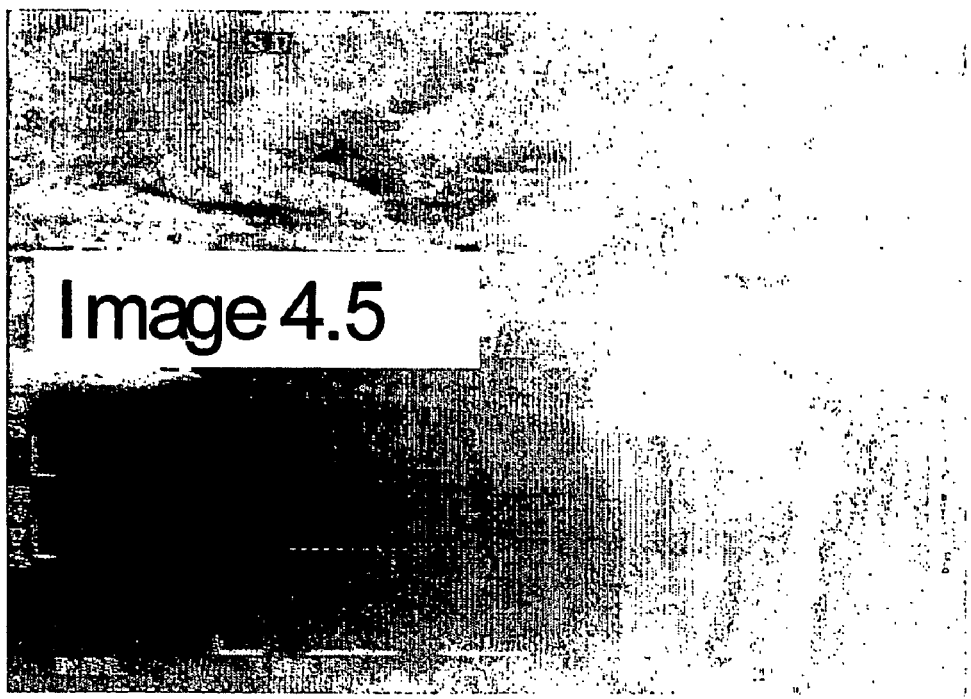
FIG. 14a shows an image taken at the FOV=9° (magnification=×4.5) in case of HFLIR.
Figure 14B:
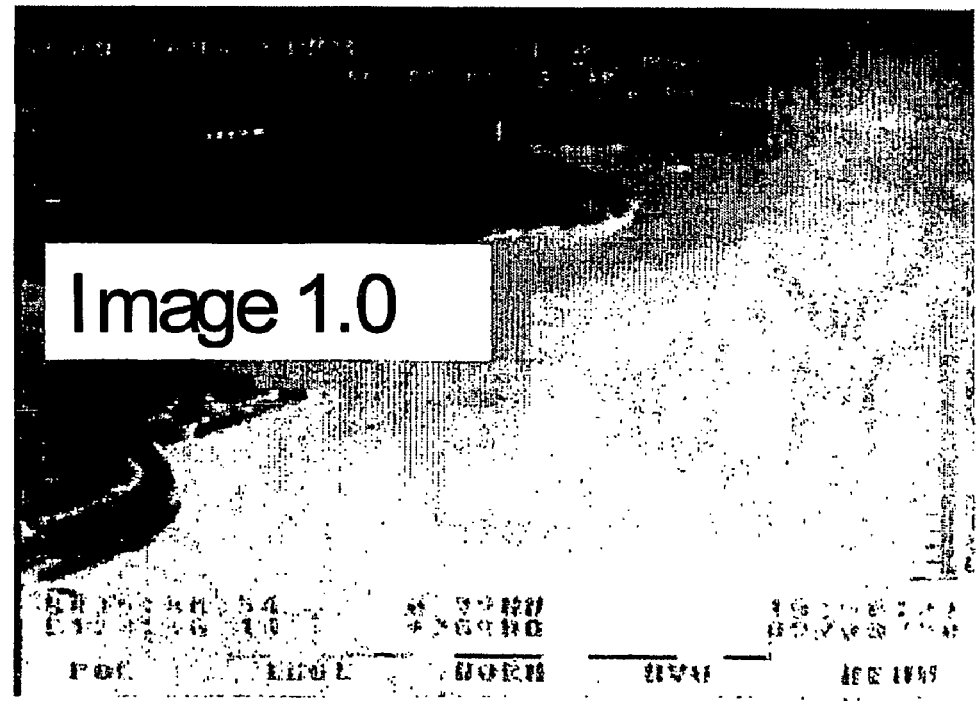
FIG. 14b shows an image taken at the FOV=40° (magnification=×1.0) in case of HFLIR.

The scan period is measured to be almost constant irrespectively of the FOV, when no serious degradation in the image quality is observed. The captured images are shown in FIG. 14. This is the fact only for the zoom camera with constant f-number, as can be seen from the theory in section B.

The test and evaluation results for this invention have been checked from the viewpoints of the scout mission fulfillment, the functional and operational convenience and the operational efficiency.

Let's consider the scout mission viewpoint. When using the scan mode at WFOV, the pilot normally observes large area on the ground in a distance by scanning the LOS with relatively high angular speed. If he finds a certain target under interest, he will gradually get narrowing the FOV and lessening the scan width and slowing the rate in order to see the target in more detail. The test results of this invention were evaluated to reflect this scout mission features quite well (see FIG. 13).

Next, considering the functional and operational viewpoints, the user can very easily adjust the FOV of the continuous zoom camera with the MFCU. The scan condition (the scan width and rate) is automatically set on the basis of the selected FOV, resulting in the FOV dependent scanning is implemented. With the help of this invention, the operator (the pilot) can easily fulfill the scout mission without any inconvenience, which would be caused by the application of manual LOS scan method to the continuous zoom camera where the scan condition must be reset at each zoom step. Moreover, the operator can select the FOV sensitivity of the scan condition proper to himself by changing the scan parameters though the calibration mode. Thus one can say that the operational efficiency for scout mission is remarkably improved by applying this invention to HFLIR.

INDUSTRIAL APPLICABILITY

This invention is applicable to all the turret aided zoom camera systems installed where the surveillance and reconnaissance mission is required: the public place like the parking place, the bank office and the park as well as the aircraft (the fixed or rotary typed flight, unmanned air vehicle) and the naval vessel (war or cruise ships) and so on.

The invention claimed is:

1. A method for the FOV dependent LOS scanning in a turret aided continuous zoom camera with the constant f-number (f/D) where one can change the field of view (FOV) continuously, wherein the scan width is dependent on the FOV via the relation below:

$$W_s = \pm(m \times FOV)$$

wherein $W_s$ is the scan width and m is the observation width constant, the mean rate of LOS scanning for half period is determined as a function of the FOV via the following relation:

$$\Omega_S = \frac{C_0}{t_e} \cdot \tan\left(\frac{FOV}{2}\right) \sim \frac{C_1}{t_e} \cdot FOV$$

wherein $\Omega_s$ and $t_e$ are respectively the scan rate and the eye integration time, the $C_0$ and $C_1$ are proportional constants;

whereby on the basis of the two equations above the FOV dependent LOS scan mechanism is expressed as follows:

$$\begin{Bmatrix} \Theta_{SCAZ}(AZ_{LOS}) \\ \Theta_{SCEL}(EL_{LOS}) \end{Bmatrix} = \begin{Bmatrix} (m \cdot FOV)\sin\left[\frac{\tan\left(\frac{FOV}{2}\right)}{n(t_e) \cdot m \cdot FOV}t\right] + AZ_{LOS} \\ EL_{LOS} \end{Bmatrix}$$ (Equation 14)

wherein $\Theta_{SCAZ}$ and $\Theta_{SCEL}$ are respectively the azimuth and elevation angles of LOS vector, The $AZ_{LOS}$ and $EL_{LOS}$ are the initial reference position of LOS in the azimuth and elevation angles, and, the $n(t_e)$ is expressed as $C'/t_e$ with constant $C'$.

2. The method according to claim 1 wherein the m ranges from 2.0 to 4.0 so that the operator can adjust the sensitivity of the scan width to the FOV by selecting one in that range.

3. The method according to claim 1 wherein the $t_e$ ranges from 0.06 to 0.11 so that the operator can adjust the sensitivity of scan rate to FOV by selecting one in that range.

4. The method according to claim 1 wherein the scan period of the camera LOS is almost constant independently on the FOV.

5. An apparatus for the FOV dependent LOS scanning in a continuous zoom camera system consisting of:
   a turret sensor module unit (TSU) including a sensor with the variable zoom optics, the mechanical structures and a stabilization driver;
   a multifunctional display unit (MFDU) displaying the image and symbology;
   a multifunctional control unit (MFCU) interfacing a camera system with an operator;
   a system electronics unit (SEU) including a system control processor (SCP), a digital servo controller (DSC), a video interface board (VIF) and a power modules (PWR) wherein the SCP is connected to the other modules, receiving and transmitting all the data in-between the constituent modules and governing the whole camera system, the DSC controls the LOS with the FOV data commanded from the MFCU via the SCP, the VIF generates the symbology related to the sensor data and the PWR supplies all the modules with power;
   wherein the SCP and DSC include a memory storing the program for the scan process algorithm to determine the scan condition according to the following relations:
   scan width=$f_1$(m, FOV); monotonous function of FOV with parameter m
   scan rate=$f_2$($t_e$, FOV); monotonous function of FOV with parameter $t_e$,
   m is the observation width constant and $t_e$ the eye integration time;
   and a calibration process is also programmed in the same memory allowing the operator to select the FOV sensitivity of the scan condition proper to himself by changing the parameters.

6. The apparatus according to claim 5 wherein the scan width is proportional to the FOV selected by the operator via the following equation:

$$W_s = \pm(m \times FOV)$$

wherein $W_s$ is the scan width and m is the observation width constant.

7. The apparatus according to claim 6 wherein the m ranges from 2.0 to 4.0 so that the operator can adjust the sensitivity of the scan width to the FOV by selecting one in that range.

8. The apparatus according to claim 5 wherein the scan rate is almost linear to the FOV selected by the operator via the following relation:

$$\Omega_S = \frac{C_0}{t_e} \cdot \tan\left(\frac{FOV}{2}\right) \sim \frac{C_1}{t_e} \cdot FOV$$

wherein $\Omega_s$ and $t_e$ are respectively the scan rate and the eye integration time, the $C_0$ and $C_1$ are proportional constants.

9. The apparatus according to claim 8 wherein the $t_e$ ranges from 0.06 to 0.11 so that the operator can adjust the sensitivity of scan rate to FOV by selecting one in that range.

10. The apparatus according to claim 5 wherein the apparatus is applied to a turret aided zoom camera that is characterized by IR (infrared) light or visible light detection.

* * * * *